F. B. PRANTE.
ANIMAL TRAP.
APPLICATION FILED JULY 1, 1914.

1,121,663.

Patented Dec. 22, 1914.

Witnesses
Robert M. Sutphen
A. A. Hind

Inventor
F. B. PRANTE
By Watson E. Coleman
Attorney

UNITED STATES PATENT OFFICE.

FREDERICK B. PRANTE, OF PACIFIC BEACH, WASHINGTON, ASSIGNOR OF ONE-HALF TO MICHAEL SPINNER, OF GATE, WASHINGTON.

ANIMAL-TRAP.

1,121,663.  Specification of Letters Patent.  Patented Dec. 22, 1914.

Application filed July 1, 1914. Serial No. 848,477.

*To all whom it may concern:*

Be it known that I, FREDERICK B. PRANTE, citizen of the United States, residing at Pacific Beach, in the county of Chehalis and State of Washington, have invented certain new and useful Improvements in Animal-Traps, of which the following is a specification, reference being had to the accompanying drawings.

This invention relates to new and useful improvements in traps, and particularly to that class of traps which are provided with spring actuated jaws.

An object of this invention is the provision of a trap having spring actuated jaws, each of the jaws being provided with a supplemental flexible jaw which when the jaws are in closed position are disposed inwardly of the main jaws to engage the foot of the animal and slack the speed of the outside jaws, to prevent the same from breaking the leg.

A further object of this invention is the provision of a trap which includes spring actuated toothed jaws, to which flexible steel spring wire jaws are connected, the flexible wire jaws being disposed below and inwardly of the toothed jaws when the same are in closed position, to prevent the animal from gnawing the leg below the main jaws of the trap.

With these and other objects in view, my invention consists in the novel construction, combination, and arrangement of parts, to be hereinafter more fully described, claimed and illustrated in the accompanying drawings, in which—

Figure 1:
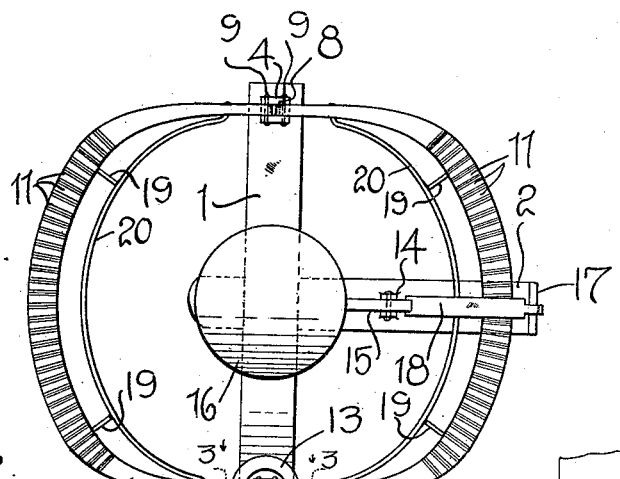
Figure 3:
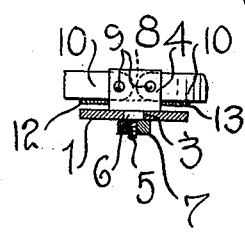
Figure 2:
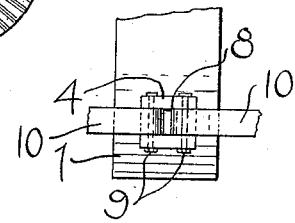
Figure 4:
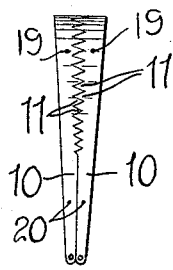
Figure 5:
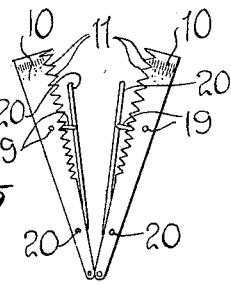

Figure 1 is a top plan view of my improved trap showing the jaws in open position; Fig. 2 is a fragmentary enlarged view of one end of the base plate showing one end of the jaws pivotally connected thereto; Fig. 3 is a sectional view on the line 3—3 of Fig. 1; Fig. 4 is an end view of the jaws in closed position showing the same removed from the base plate; and Fig. 5 is an end view of the jaws in partially open position, showing the same removed from the base plate.

Referring more particularly to the drawing, the numeral 1 designates the elongated base plate of the trap, the base plate having a pan plate 2 projecting laterally therefrom intermediate of its ends. Angular openings 3 are formed in the opposite ends of the base plate, and jaw holders 4 which are provided with reduced depending extensions 5 are adapted for connection to the opposite ends of the base plate. The reduced extensions 5 of the jaw holders are angular as at 6 at the juncture of the extensions with the body portion of the holder, the angular portion 6 being engaged in the angular openings 3 in the plate to prevent the jaw holders from turning relatively to the base plate, and the lower extremities of the extensions 5 which project below the base plate are threaded for the reception of nuts 7 whereby the jaw holders are secured to the plate 1. Each of the jaw holders 4 is provided in its upper face with an elongated groove 8, the grooves extending at right angles to the longitudinal plane of the base plate, and passing through the walls in the groove of the jaw holder is a pair of pins 9 upon which are pivotally mounted the ends of a pair of substantially U-shaped jaws 10. Each of the jaws 10 is provided in its inner face with a longitudinal series of transversely extending teeth 11, the teeth of one jaw being disposed between the teeth of the other jaw, so that the jaws when closed against the leg of an animal, will kink the hide, thus preventing the animal from pulling its leg out of the trap and also preventing the animal from twisting its leg and pulling the fur out, and preventing the pelt from becoming damaged.

To close the jaws 10, a spring 12 is provided, the spring being of the usual U-shaped construction and being provided with an enlarged apertured head 13 at one end, the head being adapted for engagement over one of the jaw holders 4 beneath the jaws, so that the upper leg of the spring upon moving upwardly owing to the tension of the metal composing the spring will close the jaws and hold the same tightly against each other. Pivotally connected adjacent one end to the upper end of a stem 14 projecting from the pan plate 2, is a trigger bar 15 to the longer or inner end of which is secured a bait pan 16, and pivotally connected to the outer upturned end 17 of the plate 2 is the outer end of a trigger 18, the trigger 18 being adapted to engage over one of the jaws 10 when the same are in open position, and the free or inner end of the trigger 18 is adapted to be engaged by the shorter end of the trigger bar 15 whereby the jaws are held in open position, and the bait pan 16 is disposed above the pivotal point of the trigger bar 15. Connected adjacent their opposite ends by rivets 19 to the jaws 10 are flexible steel wire jaws 20, the intermediate portions of flexible jaws 20 being disposed inwardly and downwardly of the jaws 10, and having their opposite ends secured to the jaws 10 adjacent the opposite ends of the latter jaws.

In the practical use of my improved trap bait is placed above the bait pan 16 and the jaws are opened in the usual manner and held in their open position against tension of the spring 12 by the trigger 18 which engages the trigger bar 15 connected to the pan, and it will be seen that when the foot of an animal depresses the pan 16, the trigger 18 will be released to allow the tension of the spring 12 to close the jaws. As the jaws are forced to their closed position to engage the leg of the animal, the inner flexible jaws first engage the leg of the animal to slacken the speed of the outside toothed jaws, and prevent the same from engaging the leg of the animal with such force as to break the same. It is a well known fact, that animals very seldom attempt to gnaw out of a trap if the leg is not broken, and that animals never gnaw above the jaws which engage the leg. It will be seen that owing to the disposition of the flexible jaws below the toothed jaws of the trap, that the animal will be prevented from gnawing on the leg below the main jaws of the trap, should the leg become accidentally broken by the animal's attempt to disengage itself from the trap, or by any other means.

It will be seen from the drawing taken in connection with the above description, that the several parts of the trap may be readily disconnected, it being merely necessary to turn the nuts 7 off the threaded extensions 5 of the jaw holders, when it is desired to remove the jaws from the base plate and the jaws may be readily disengaged from the holders by removing the pins 9 upon which the ends of the jaws are pivotally mounted.

Having thus fully described my invention, what I desire to claim and secure by Letters Patent, is:—

1. A device of the character described comprising a base plate, spring actuated main jaws pivotally connected to said base plate, means for holding the jaws in open position against the tension of the spring, and yielding supplemental jaws connected to the first mentioned jaws and disposed slightly inward thereof, but out of alinement therewith.

2. A device of the character described comprising a base plate, spring pressed jaws pivotally connected to said base plate, flexible supplemental jaws connected at their opposite ends to the first mentioned jaws, the intermediate portions of said supplemental jaws being disposed inwardly and downwardly of the first mentioned jaws, means for holding said jaws in open position against the tension of the spring, and means for releasing the last mentioned means.

3. A device of the character described comprising a base plate, a plate extending laterally from the base plate intermediate of its ends, jaws pivotally connected at their opposite ends to said base plate, flexible supplemental jaws connected at their opposite ends to the first mentioned jaws, said supplemental jaws being disposed inwardly and downwardly of the first mentioned jaws intermediate of their ends, a trigger pivotally connected to the outer extremity of the laterally extending plate, said trigger being adapted to engage over one of said jaws to retain the same in open position against the tension of the spring, a trigger bar pivotally connected to the laterally extending plate for engagement at one end with the trigger to lock the jaws in open position, and a bait pan carried by the opposite end of the trigger bar.

4. A device of the character described comprising a base plate, substantially U-shaped spring pressed jaws pivotally connected at their opposite ends to said base plate, means for holding the jaws in open position against the tension of the spring, and flexible wire jaws connected at their opposite ends to the first mentioned jaws adjacent their opposite ends, the intermediate portions of the flexible jaws being disposed inwardly and below the first mentioned jaws.

5. In a trap of the character described, a movably mounted jaw, and an independent resiliently yielding supplemental jaw disposed inward of the first mentioned jaw and out of alinement therewith.

6. In a trap, a movably mounted jaw and a resiliently yielding member extending parallel to but out of alinement with the jaw and disposed inward thereof.

7. In a trap, a base plate, spring actuated oppositely disposed jaws pivotally connected to the base plate, a trigger mechanism for holding the jaws in open position, and resiliently yielding members mounted upon and movable with the jaws and disposed each in a plane in advance of the inner face of each jaw and out of alinement therewith.

In testimony whereof I hereunto affix my signature in the presence of two witnesses.

FREDERICK B. PRANTE.

Witnesses:
JEFF D. GLENN,
CHARLIE E. KELLEY.

Copies of this patent may be obtained for five cents each, by addressing the "Commissioner of Patents, Washington, D. C."